United States Patent [19]

Schröter et al.

[11] Patent Number: 5,054,529
[45] Date of Patent: Oct. 8, 1991

[54] FILLING CAR FOR A OVEN BATTERY

[75] Inventors: Horst Schröter, Viersen; Horst Andreas, Düsseldorf, both of Fed. Rep. of Germany

[73] Assignee: Hartung, Kuhn & Co. Maschinenfabrik GmbH, Essen, Fed. Rep. of Germany

[21] Appl. No.: 505,701

[22] Filed: Apr. 5, 1990

[30] Foreign Application Priority Data

Apr. 22, 1989 [DE] Fed. Rep. of Germany ....... 3913320

[51] Int. Cl.⁵ ............................................... B65B 3/04
[52] U.S. Cl. ..................................... 141/312; 141/93; 141/383; 141/287; 141/266
[58] Field of Search .................... 141/93, 98, 263, 266, 141/279, 284, 312, 383, 287

[56] References Cited

U.S. PATENT DOCUMENTS

| 3,519,035 | 7/1970 | Remane | 141/287 X |
| 4,180,272 | 12/1979 | Heitz | 141/287 X |
| 4,469,152 | 9/1984 | Hardee et al. | 141/312 |

FOREIGN PATENT DOCUMENTS

| 2510097 | 9/1976 | Fed. Rep. of Germany . |
| 2559390 | 8/1977 | Fed. Rep. of Germany . |
| 2922571 | 8/1985 | Fed. Rep. of Germany . |
| 1287872 | 9/1972 | United Kingdom | 141/287 |

Primary Examiner—Ernest G. Cusick
Attorney, Agent, or Firm—Michael J. Striker

[57] ABSTRACT

A filling car for filling coal into oven chambers of a coke oven battery comprises an immovable filling connecting piece mountable on a coal container, a filling pipe closely surrounding the connecting piece and having a lower end lowerable to a filling opening frame of filling openings of a coke oven battery, the filling pipe also having an upper end, and a housing arranged on the upper end of the filling pipe and accommodating an elastic sealing ring, the sealing ring surrounding the connecting piece and being displaceable with the filling pipe and also pressed against the filling pipe during a filling process so as to provide a sealing between the filling pipe and the connecting piece.

7 Claims, 3 Drawing Sheets

5,054,529

FILLING CAR FOR A OVEN BATTERY

BACKGROUND OF THE INVENTION

The present invention relates to a filling car or larry for filling coal in oven chambers of a coke oven battery. More particularly, it relates to such a filling car which has an immovable filling connecting piece mountable on a coal container, and a telescopably displaceable filling pipe which tightly surrounds the connecting piece and has a lower end lowerable to the filling opening frame of the filling openings of the coke oven battery.

Filling cars of the above mentioned general type are known in the art. During operation of such a filling car with the measures taken nowadays for maintaining cleanness of the air, it is inevitably necessary to catch the dust-containing gas which escapes during filling of the oven chambers and to supply it to the receiver of the coke oven battery. This requires an efficient sealing between the movable filling pipe and the immovable filling connecting piece. German document DE-AS 2,510,097 and DE-AS 2,559,390 propose sealing elements in form of a bellows which can be composed of spring steel or wire reinforced asbestos or another heat-resistant fiber material.

The above mentioned structural elements which are also known as compensators, completely or partially cover a stroke of the movable filling pipe, in addition to their sealing function. Due to their construction and due to their material, the compensators are very expensive and very susceptible to high temperatures as well corroding-dust-containing gas, and allow only a short path in the region of approximately 25 mm.

Since the lower end of the filling pipe during each filling step must tightly sit on the filling opening frame of the respective filling opening, different stroke movements of the filling pipe in the vertical direction are required in dependence on the property and position of the filling opening frame. The magnitude of the required stroke movements can lie in a region, for which a compensator is not designed as a rule. This is especially the case for old coke oven batteries, in which partially significant height differences in the position of the individual filling opening frames can occur. This leads to the result that the filling pipe can no longer be lowered tightly against the filling opening frame. The thusly produced untightness between the filling pipe and the filling opening frame results in an undesirable escape of filling gas into the atmosphere. A forcedly arranged sealing leads to a damage or complete destruction of the compensator.

SUMMARY OF THE INVENTION

Accordingly, it is an object of the present invention to provide a filling car of the above mentioned general type, which avoids the disadvantages of the prior art.

More particularly, it is an object of the present invention to provide a filling car of the above mentioned general type, which allows greater height differences between the individual filling opening frames with a efficient sealing between the filling and the filling connecting piece on the one hand, and the lower end of the filling pipe and the respective filling opening frame on the other hand.

In keeping with these objects and with others which will become apparent hereinafter, one feature of the present invention resides, briefly stated, in a filling car or larry for a coke oven batter, which is provided with a housing arranged on the upper end of the filling pipe and accommodating an elastic sealing ring which surrounds and displaces together with the filling pipe and during the filling process is mechanically or pneumatically pressed against the filling pipe to provide a sealing between the filling pipe and the filling connecting piece.

The sealing ring can have a tubular, cushion-shaped, U-shaped, rectangular or square profile. It can be composed of an elastic, preferably heat-resistant material, such as for example special steel.

For increasing the flexibility, the sealing ring can be segment shaped or provided with a slot. Also, metal rings formed as piston rings and assembled through a tongue can be used as well. Also, an inflatable metallic membrane can be utilized. Finally, it is possible to provide several rings instead of a single sealing ring.

In accordance with another feature of the present invention, the inner diameter of the sealing ring in an unloaded condition can h=somewhat greater than the outer diameter of the filling pipe.

Still another feature of the present invention is that the sealing ring in the unloaded condition can have a free gap which is closeable by compressing the sealing ring during the operation for example by means of a cylinder-piston unit.

Additional sliding ring seals can be provided on the upper and lower sides of the sealing ring and guided in guiding grooves of the housing.

A tubular pipe can be connected for example by welding with the filling pipe and composed of a heat displacement preventing material.

The pipe can have a mechanically worked smooth outer surface, and arranged so that its length and position corresponds to the length and position of the required stroke movement of the filling pipe.

The housing can be provided with a conduit for supplying of pressure air or another gaseous medium under high pressure.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
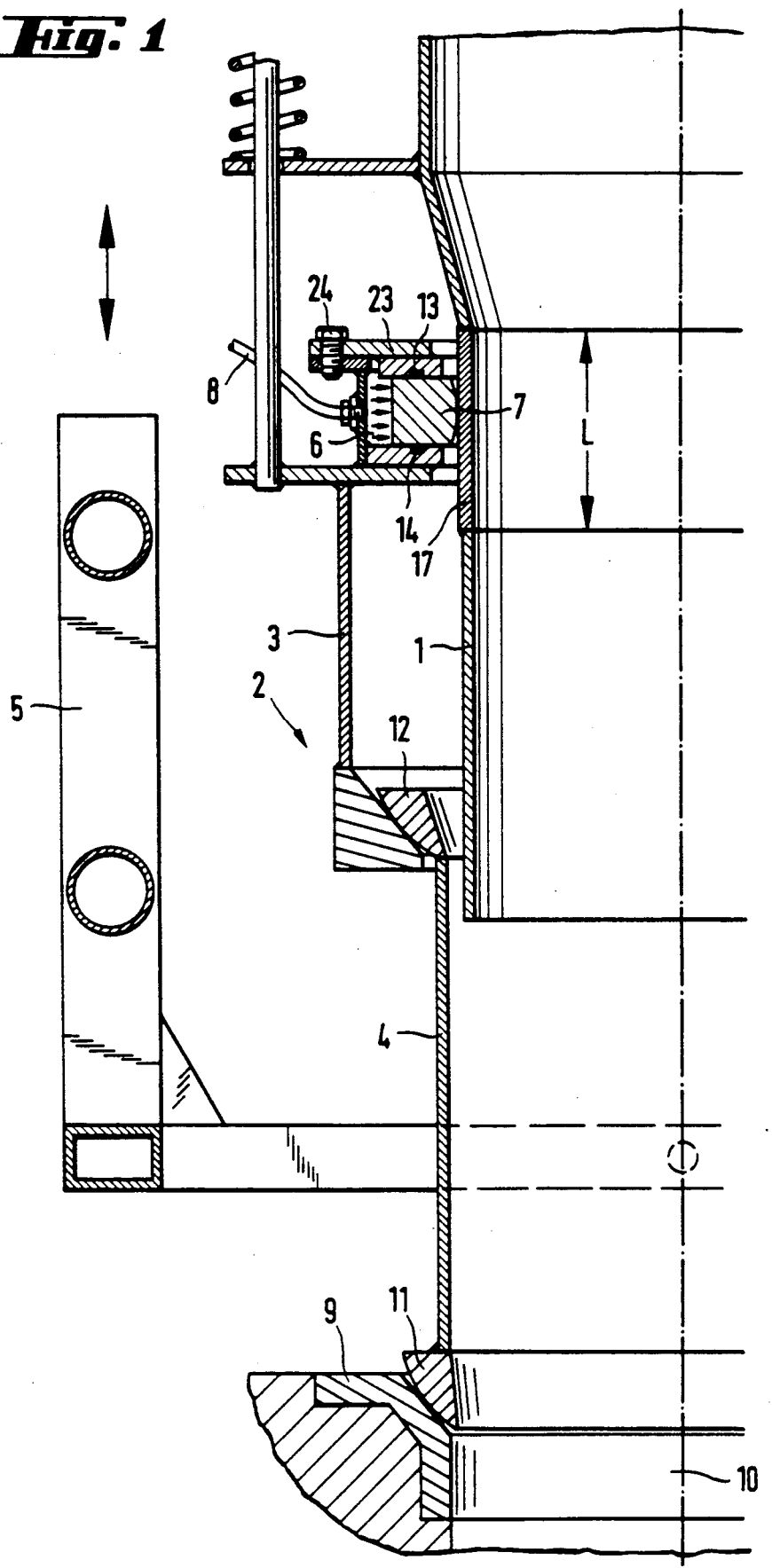
FIG. 1 is a schematic view showing a section of a filling car or larry in accordance with the present invention.

FIG. 1 shows an immovable filling connecting piece or nozzle which is identified with reference numeral 1. The connecting piece 1 is arranged on a coal container of a filling car or larry. The coal container as well as other details of the filling car are not shown in the drawings, since they are not important for understanding of the present invention. They can be formed in correspondence with the prior art.

Figure 2:
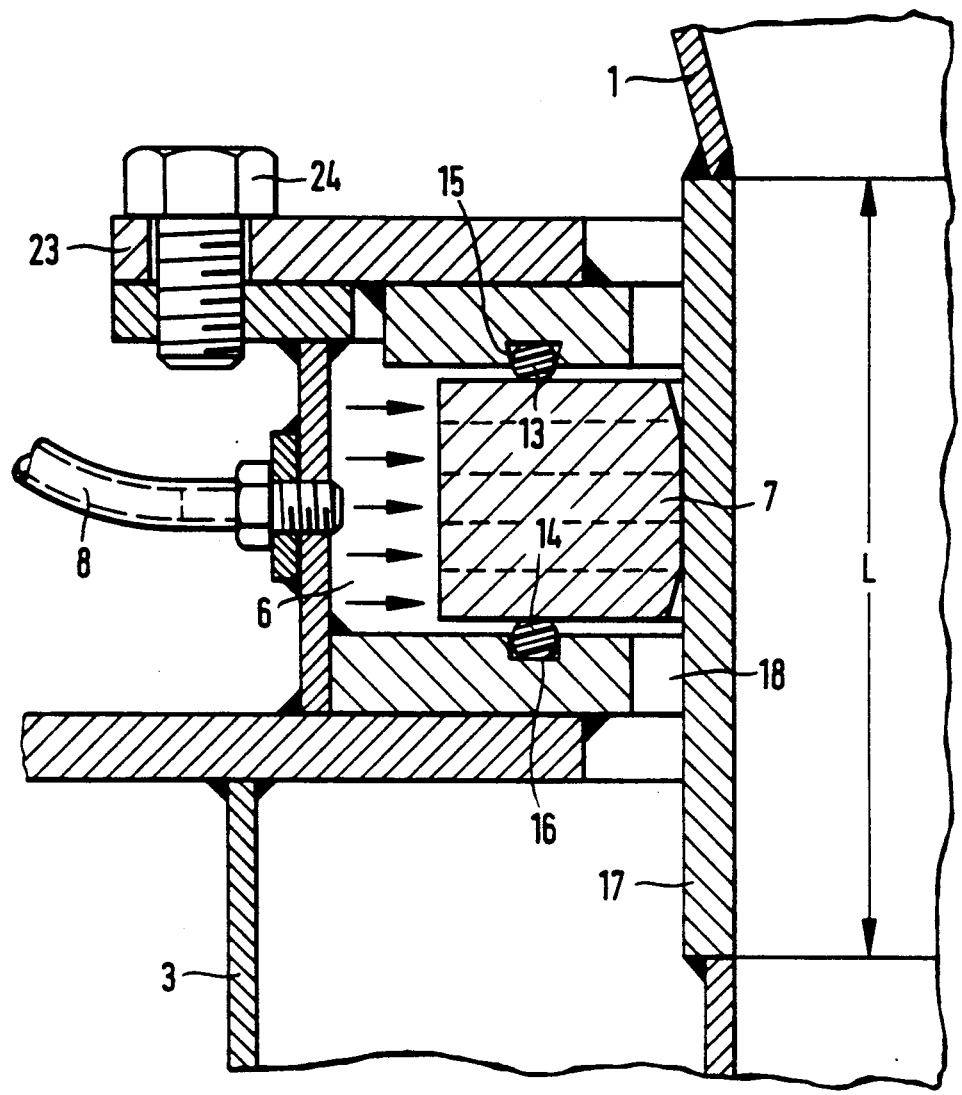
FIG. 2 is a view showing a section of a housing arranged on a filling pipe and containing a sealing ring of the inventive filling car on an enlarged scale.

The coal container is arranged in any case above the filling connecting piece 1. The coal flows under the action of gravity into the connecting piece 1 and through the latter flows out of the coal container. Since the connecting piece 1 and a filling pipe 2 which surrounds the connecting piece have a circular cross-section, only left half of the respective parts is shown in FIGS. 1 and 2. The arrangement is symmetrical and therefore the right halves corresponds to the left halves.

The filling pipe 2 is telescopeable and composed of two pipe pieces 3 and 4. Therefore it can be lifted and lowered in a vertical direction as identified by a double arrow in the drawing. In the praxis, the filling pipe 2 naturally can be composed of more than two pipe pieces arranged telescopeable in one another. A housing 6 is located at the upper end of the filling pipe 2. It is provided with a solid sealing ring 7 which surrounds the connecting piece 1. The inner diameter of the sealing ring 7 in unloaded condition is somewhat greater than the outer diameter of the connecting piece 1 so that it can be fitted without difficulties on the connecting piece 1 in a vertical direction in correspondence with the movement of the filling pipe 2.

A conduit 8 is provided for supplying pressure air or another pressure gas into the housing 6. Further details of the arrangement will be explained in connection with FIG. 2. Prior to the beginning of the filling process, the filling pipe 2 is lowered by a lifting device 5 onto a filling opening frame 9 of a filling opening 10 of an oven chamber to be charged. Sealing rings 11 and 12 are arranged on the lower and upper ends of the pipe piece 4 and serve for a gas-tight sealing with the filling opening frame 9 and the pipe piece 3. Simultaneously, the sealing ring 7 is pressed pneumatically or mechanically against the connecting piece 1 so that a gas-tight sealing between it and the filling pipe 2 is ensured. It is therefore guaranteed that during the filling process no gas can escape from the system.

FIG. 2 shows further details of the housing 6 and the sealing ring 7 located in it, on an enlarged scale. It is to be understood that the structural parts corresponding to the parts of FIG. 1 are provided with the same reference numerals. The housing 6 in this case is closed from above by cover plate 23 which is connected a screw connection 24 or other means with the remaining parts of the housing in a releasable manner. Thereby, when needed the sealing ring 7 can be exchanged after removal of the cover plate 23. In the embodiment shown in the drawings, the upper and lower sides of the sealing ring 7 are additionally provided with sliding ring seals 13 and 14. The seals 13 and 14 are accommodated in guiding grooves 15 and 16. Moreover, in this embodiment a pipe 17 is welded in the connecting piece 1 is its extention. The pipe 17 is composed of a thick-walled material which prevents thermal displacement, such as for example boiler construction steel. It has a mechanically worked smooth surface insuring an efficient sealing by the sealing ring 7. The length L and the position of the pipe 17 corresponds exactly to the length and the position of a required vertical stroke movement of the filling pipe 2. Therefore the sealing ring 7 always reciprocates over the smooth outer surface of the pipe 17 during the stroke movement.

As long as the filling pipe 2 prior to the filling process itself is lowered to the filling opening frame 9, pressure air or another pressure gas is supplied into the housing 6 through the conduit 8 and presses the sealing ring 7 in the direction of the arrow against the pipe 17 or the filling pipe 2. Thereby the required sealing between the filling pipe 2 and the connecting piece 1 is ensured, and as as a result the gas produced during filling can not escape to the atmosphere through the gap 18. The escape of this gas moreover is additionally influenced or prevented in that the gaseous medium supplied through the conduit 8 has a significantly higher pressure than the gas rising from the filling opening 10. The operational safety of the inventive construction is also insured when a certain untightness occurs between the housing 6 and the sealing ring 7. After ending of the filling process, the pressure gas is again released from the housing 6 and therefore the sealing ring 7 is unloaded.

Figure 3:
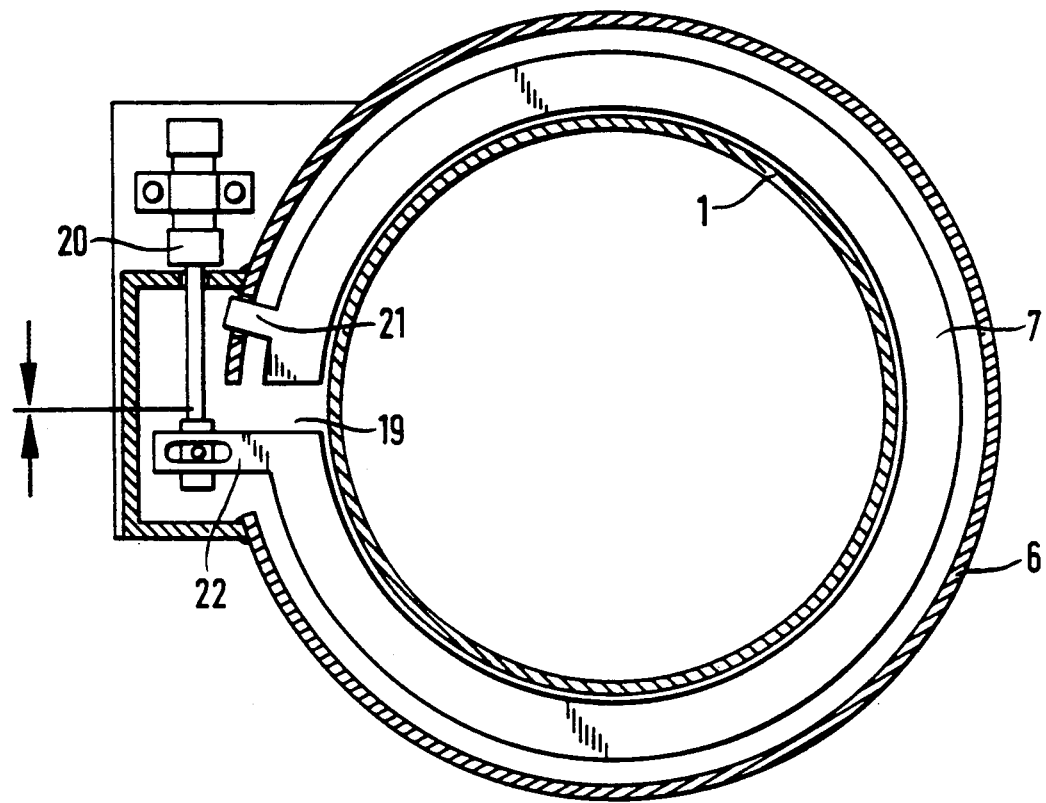
FIG. 3 is a plan view showing a further embodiment of the sealing ring with a mechanical pressing device.

FIG. 3 shows another embodiment of the sealing ring 7. In this case it is pressed mechanically against the connecting piece 1. The sealing ring 7 is not completely closed. Instead, in an unloaded condition it has a free gap 19. Therefore a free space required for the stroke movement is simultaneously produced between the sealing ring 7 and the connecting piece 1. For sealing, the sealing ring 7 is compressed by a cylinder-piston unit 20 in direction of the arrow. As a result, it is firmly pressed against the connecting piece 1 and the free gap 19 is simultaneously closed. One end of the sealing ring 7 is connected by a tongue 21 with the housing 6, while the other end of the sealing ring 7 is connected through a tongue 22 with the cylinder-piston unit 20. The drive of the cylinder-piston unit 20 can be performed by a motor, as well as hydraulically or pneumatically.

The utilization of the inventive construction eliminates the above described disadvantages. Greater height differences in the position of the individual filling opening frames can be overlapped and simultaneously the required sealing between the filling opening frame and the filling pipe can be maintained. The inventive device has moreover a simple construction and therefore involves low structural and maintenance costs.

It will be understood that each of the elements described above, or two or more together, may also find a useful application in other types of constructions differing from the types described above.

While the invention has been illustrated and described as embodied in a filling car for filling coal in a coke oven battery, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A filling car for filling coal into oven chambers of a coke oven battery, comprising an immovable filling connection piece mountable on a coal container; a filling pipe closely surrounding said connecting piece and having a lower end lowerable to a filling opening frame of filling openings of a coke oven battery, said filling pipe also having an upper end; a housing arranged on said upper end of said filling pipe; a solid elastic sealing ring accommodated in said housing and mechanically pressable against said filling pipe, said solid elastic sealing ring surrounding said connecting piece and being displaceable with said filling pipe and also pressed against said filling pipe during a filling process so as to provide a sealing between said filling pipe and said connecting piece; and means for mechanically pressing said sealing ring against said filling pipe.

2. A filling car as defined in claim 1, wherein said solid elastic sealing ring has a closable free gap; and wherein said means for mechanically pressing said sealing ring against said filling pipe comprises means for closing said closable free gap including a cylinder-piston unit.

3. A filling car for filling coal into oven chambers of a coke oven battery, comprising an immovable filling connecting piece mountable on a coal container; a filling pipe closely surrounding said connecting piece and having a lower end lowerable to a filling opening frame of filling openings of a coke oven battery, said filling pipe also having an upper end; a housing arranged on said upper end of said filling pipe and accommodating an elastic sealing ring, said sealing ring surrounding said connecting piece and being displaceable with said filling pipe and also pressed against said filling pipe during a filling process so as to provide a sealing between said filling pipe and said connecting piece, said sealing ring having upper and lower sides; and sliding ring seals provided at said upper and said lower sides of said sealing ring.

4. A filling car as defined in claim 3, wherein said housing has guiding grooves, said sliding ring seals being arranged in said guiding grooves of said housing.

5. A filling car for filling coal into oven chambers of a coke oven battery, comprising an immovable filling connecting piece mountable on a coal container; a filling pipe closely surrounding said connecting piece and having a lower end lowerable to a filling opening frame of filling openings of a coke oven battery, said filling pipe also having an upper end; and a housing arranged on said upper end of said filling pipe and accommodating an elastic sealing ring, said sealing ring surrounding said connecting piece and being displaceable with said filling pipe and also pressed against said filling pipe during a filling process so as to provide a sealing between said filling pipe and said connecting piece, said filling pipe having an extension formed as an additional pipe and composed of a heat deformation preventing material.

6. A filling car as defined in claim 5, wherein said additional pipe has a smooth outer surface and a length and a position corresponding to a length and a position of a displacement of said filling pipe.

7. A filling car for filling coal into oven chambers of a coke oven battery, comprising an immovable filling connection piece mountable on a coal container; a filling pipe closely surrounding said connecting piece and having a lower end lowerable to a filling opening frame of filling openings of a coke oven battery, said filling pipe also having an upper end; a housing arranged on said upper end of said filling pipe; a solid elastic sealing ring accommodated in said housing and being pressable against said filling pipe, said sealing ring surrounding said connecting piece and being displaceable with said filling pipe and also pressed against said filling pipe during a filling process so as to provide a sealing between said filling pipe and said connecting piece; and a conduit connected to said housing and opening into said housing, said conduit being arranged for supplying a pressurized gaseous medium so as to press said sealing ring against said filling pipe, when said pressurized gaseous medium is fed to said housing through said conduit.

* * * * *